United States Patent
Shivashankaraiah

(10) Patent No.: US 11,190,911 B2
(45) Date of Patent: Nov. 30, 2021

(54) AUTOMATIC QUERY-BASED COMMUNICATION SYSTEM

(71) Applicant: International Business Machines Corporation, Armonk, NY (US)

(72) Inventor: Nataraj Shivashankaraiah, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/508,438

(22) Filed: Jul. 11, 2019

(65) Prior Publication Data

US 2021/0014652 A1    Jan. 14, 2021

(51) Int. Cl.
| | | |
|---|---|---|
| *H04W 4/18* | (2009.01) | |
| *H04W 4/16* | (2009.01) | |
| *H04W 4/12* | (2009.01) | |
| *G06F 40/20* | (2020.01) | |
| *G06F 40/35* | (2020.01) | |
| *G06F 16/242* | (2019.01) | |
| *H04L 12/58* | (2006.01) | |
| *H04M 3/527* | (2006.01) | |
| *H04M 3/42* | (2006.01) | |

(52) U.S. Cl.
CPC .......... *H04W 4/185* (2013.01); *G06F 16/243* (2019.01); *G06F 40/20* (2020.01); *H04L 51/20* (2013.01); *H04L 51/32* (2013.01); *H04L 51/38* (2013.01); *H04W 4/12* (2013.01)

(58) Field of Classification Search
CPC ....... H04W 4/12; H04W 4/185; H04W 4/021; H04W 4/024; H04W 4/16; H04L 51/20; H04L 51/32; H04L 51/38; H04L 12/58; H04L 51/02; G06F 16/243; G06F 17/27; G06F 40/20; G06F 40/35; G06F 16/3344; G06Q 10/02; G06T 19/006; G09B 21/006
See application file for complete search history.

(56) References Cited

U.S. PATENT DOCUMENTS

| | | | |
|---|---|---|---|
| 8,996,639 B1 | 3/2015 | Faaborg et al. | |
| 10,212,103 B2 | 2/2019 | Rubinstein et al. | |
| 2008/0091786 A1* | 4/2008 | Jhanji | G06Q 30/0267 |
| | | | 709/206 |

(Continued)

FOREIGN PATENT DOCUMENTS

WO    WO2018097968 A1    5/2018

*Primary Examiner* — Yuwen Pan
*Assistant Examiner* — Hung K Du
(74) *Attorney, Agent, or Firm* — Yee & Associates, P.C.

(57) ABSTRACT

An incoming message is responded to by a computer system. The incoming message is received by the computer system. Natural language processing is performed on the incoming message by the computer system to generate a query in response to an automatic response to the incoming message being enabled for an originator of the incoming message. Information responsive to the query and contextual information related to the query from information sources are identified by the computer system using the query generated from the natural language processing of the incoming message. An outgoing message is generated by the computer system using the information and the contextual information. The outgoing message is sent by the computer system to the originator of the incoming message.

13 Claims, 10 Drawing Sheets

(56) References Cited

U.S. PATENT DOCUMENTS

| | | | |
|---|---|---|---|
| 2013/0203393 A1* | 8/2013 | Bugalia | H04W 4/16 |
| | | | 455/414.1 |
| 2015/0045003 A1* | 2/2015 | Vora | H04M 1/64 |
| | | | 455/412.2 |
| 2018/0302350 A1* | 10/2018 | Luo | G06F 3/0236 |
| 2018/0330722 A1* | 11/2018 | Newendorp | G10L 15/1815 |
| 2018/0337870 A1* | 11/2018 | Schubert | H04L 51/02 |
| 2019/0132436 A1* | 5/2019 | Jang | H04W 4/80 |
| 2020/0099633 A1* | 3/2020 | D'Agostino | G06F 3/0481 |

\* cited by examiner

AUTOMATIC QUERY-BASED COMMUNICATION SYSTEM

BACKGROUND

1. Field

The disclosure relates generally to an improved computer system and, more specifically, to a method, apparatus, system, and computer program product for automatically replying to messages.

2. Description of the Related Art

When a user receives a phone call on a mobile phone, the user can answer the call or decline the call. On many mobile phones, when the call is declined, the caller does not receive information about the status of the user with a reason why the user cannot answer the call. For example, the caller may not know that the user has declined the call because the user is driving a vehicle, attending a meeting, or is simply unavailable.

Some mobile phones have the ability to send a reply message when a call is declined. The reply message is sent as a text message to reply to the inbound call that is declined. When declining the call, the user may choose from a set of responses displayed on the screen for selection by the user. These responses may be preconfigured default responses in the mobile phone or the response may be custom responses created by the user for the mobile phone. Although these types of responses provide information to the caller, these responses require user input from the user of the mobile phone to send the response.

SUMMARY

According to one embodiment of the present invention, a method responds to an incoming message. The incoming message is received by a computer system. A query is generated by the computer system performing natural language processing on the incoming message in response to an automatic response to the incoming message being enabled for an originator of the incoming message. Information responsive to the query and contextual information related to the query from information sources are identified by the computer system using the query generated from the natural language processing of the incoming message. An outgoing message is generated by the computer using the information and the contextual information. The outgoing message is sent by the computer system to the originator of the incoming message.

According to another embodiment of the present invention, an automatic message reply system comprises a computer system that receives an incoming message. The computer system performs natural language processing of the incoming message to generate a query in response to an automatic response to the incoming message being enabled for an originator of the incoming message. The computer system identifies information responsive to the query and contextual information related to the query from information sources using the query generated from the natural language processing of the incoming message. The computer system generates an outgoing message using the information and the contextual information. The computer system sends the outgoing message to the originator of the incoming message.

According to yet another embodiment of the present invention, a computer program product for responding to an incoming message comprises a computer-readable-storage media with first program code, second program code, third program code, fourth program code, and fifth program code stored on the computer-readable storage media. The first program code is executed to receive the incoming message. The second program code is executed to perform natural language processing on the incoming message to generate a query in response to an automatic response to the incoming message being enabled for an originator of the incoming message. The third program code is executed to identify information responsive to the query and contextual information related to the query from information sources using the query generated from the natural language processing of the incoming message. The fourth program code is executed to generate an outgoing message using the information and the contextual information. The fifth program code is executed to send the outgoing message to the originator of the incoming message.

DETAILED DESCRIPTION

Figure 1:
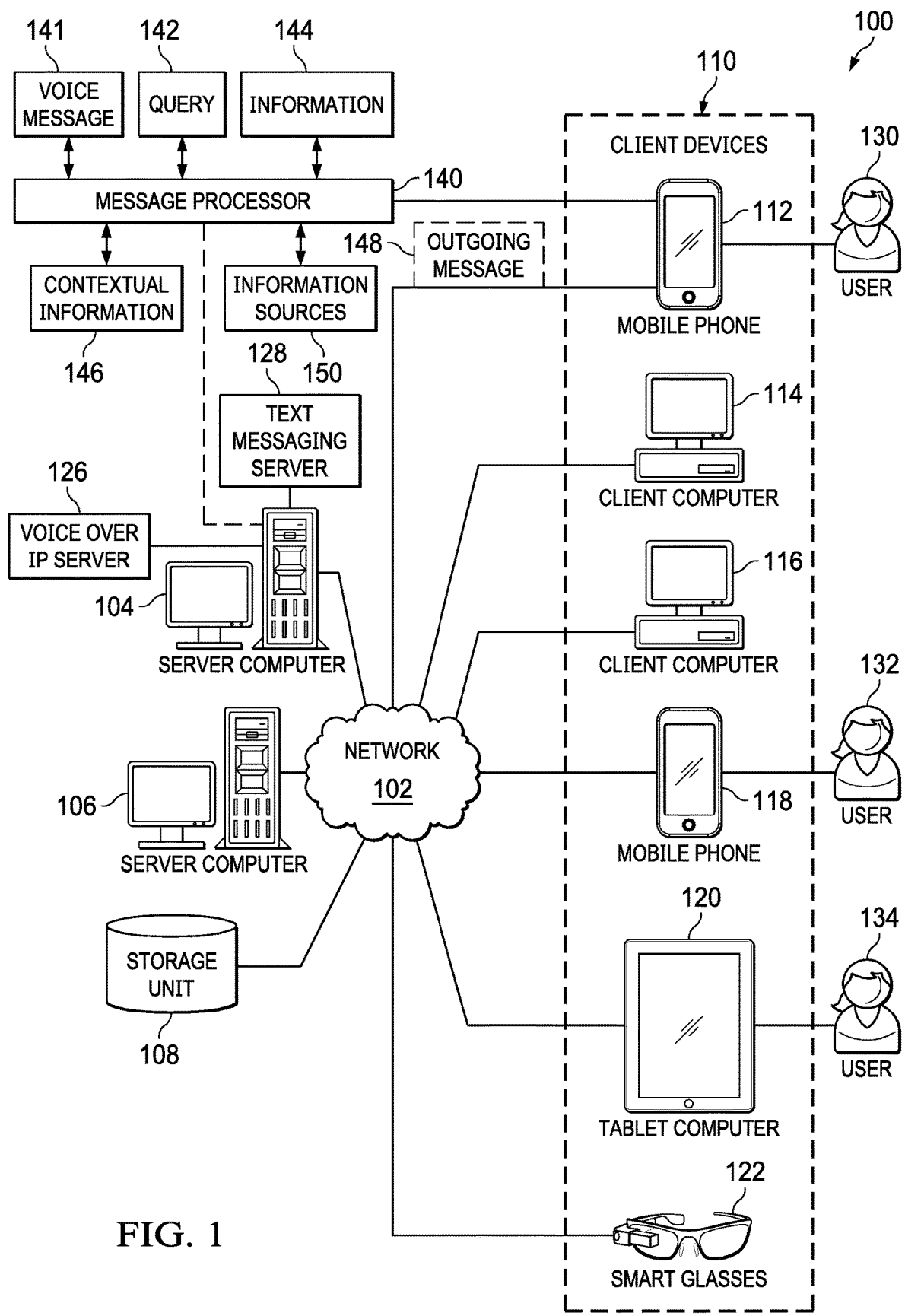
FIG. 1 is a pictorial representation of a network of data processing systems in which illustrative embodiments may be implemented.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account a number of different considerations. For example, the illustrative embodiments recognize and take into account that currently a user can send a caller a message when on a call. The illustrative embodiments recognize and take into account that the response is not automatic. User input is received from the user to select and send a response to a caller while still on a current call and the response selected by the user is sent as a text message. The illustrative embodiments recognize and take into account that these messages are not automatically sent and may not reflect what information the user wants to provide to a particular caller when the user is unavailable.

Thus, the illustrative embodiments provide a method, an apparatus, a system, and a computer program product for responding to an incoming message. A computer system receives the incoming message. Natural language processing is performed by the computer system on the incoming message to generate a query in response to an automatic response to the incoming message being enabled for an originator of the incoming message. The computer system identifies information responsive to the query and contextual information related to the query from information sources using the query generated from the natural language processing of the incoming message. The computer system generates an outgoing message using the information and the contextual information. The computer system sends the outgoing message to the originator of the incoming message. The response to the incoming message is performed automatically without user input from the user.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include mobile phone 112, client computer 114, client computer 116, mobile phone 118, tablet computer 120, and smart glasses 122.

In the depicted example, server computer 104 provides information, such as boot files, operating system images, and applications to client devices 110. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 can be clients to server computer 104 in this example. For example, server computer 104 can provide messaging services in the form of voice and text. These messaging services can be provided using, for example, voice over IP (VoIP) server 126 and text messaging server 128. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments. In these illustrative examples, network 102 can also include hardware and infrastructure for facilitating voice calls using technology such as voice over IP, global system for mobile communications (GSM), long-term evolution (LTE), Time division multiple access (TDMA), frequency division multiple access (FDMA), code division multiple access (CDMA), and other technology used for voice communications.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, mobile phone 112 is used or carried by user 130. In this example, user 132 operates mobile phone 118 to make a call to user 130. In this example, user 130 is unavailable. In this depicted example, user 130 is on a call with user 134 while driving or riding in a car to the office.

As depicted, user 132 is a coworker who is relying on user 130 to attend a meeting at the office. User 130 is unavailable and does not answer the call from user 132. User 132 leaves a voice message asking where user 130 is located. User 132 desires this information to determine whether to postpone or cancel the meeting.

As depicted, automatic responses to incoming messages are enabled by user 130. In particular, automatic responses are enabled for messages received from contacts that include user 132. In this illustrative example, message processor 140 generates automatic replies. As depicted, message processor 140 runs on mobile phone 112. In other illustrative examples, message processor 140 can run on server computer 104 or can be distributed between both mobile phone 112 and server computer 104.

In this illustrative example, voice message 141 left by user 132 is an incoming message that message processor 140 processes to generate a natural language understanding of voice message 141. In other words, voice message 141 is converted into formal representations, such as first order logic structures that can be manipulated by software. In this example, voice message 141 is processed to generate query 142.

In this illustrative example, message processor 140 identifies the current location of user 130 from global positioning system information generated by a global positioning system receiver in mobile phone 112. The current position is information 144 that is responsive to query 142. In this example, the current position can be a location on a map, such as 5$^{th}$ and Main Street.

Further, message processor 140 identifies contextual information 146 related to query 142 from information sources 150. For example, message processor 140 determines that the time is 7:45 AM and a navigation application on mobile phone 112 shows that user 130 is driving to the office in slow traffic on Main Street and will reach the office by 8:15 AM. Message processor 140 also accesses a calendar application and determines that user 130 has a meeting scheduled with user 132 in the office at 8:30 AM.

In this illustrative example, contextual information 146 related to the location of user 130 is that user 130 is driving to the office in slow traffic on Main Street. Further, contextual information 146 includes that user 130 has a meeting with user 132. Based on information 144 and contextual information 146, message processor 140 generates outgoing message 148 and sends outgoing message 148 to user 132. In this illustrative example, outgoing message 148 is a text message that reads as follows "Dave, I am at 5th and Main Street and traveling in slow traffic on Main Street and will reach the office at 8:15 AM in time for the meeting." In other illustrative examples, outgoing message 148 can be a voice message sent as a call to user 132 at mobile phone 118.

This detailed and useful information sent to user 132 allows user 132 to know that user 130 will attend the meeting scheduled at 8:30 AM. This response is in contrast to current messaging systems. With current messaging systems, the call is not answered and a text message is returned saying something along the lines of "I am driving and I will call or message you back." This type message would not provide user 132 with the information needed to know whether user 130 would be able to attend the meeting.

Figure 2:
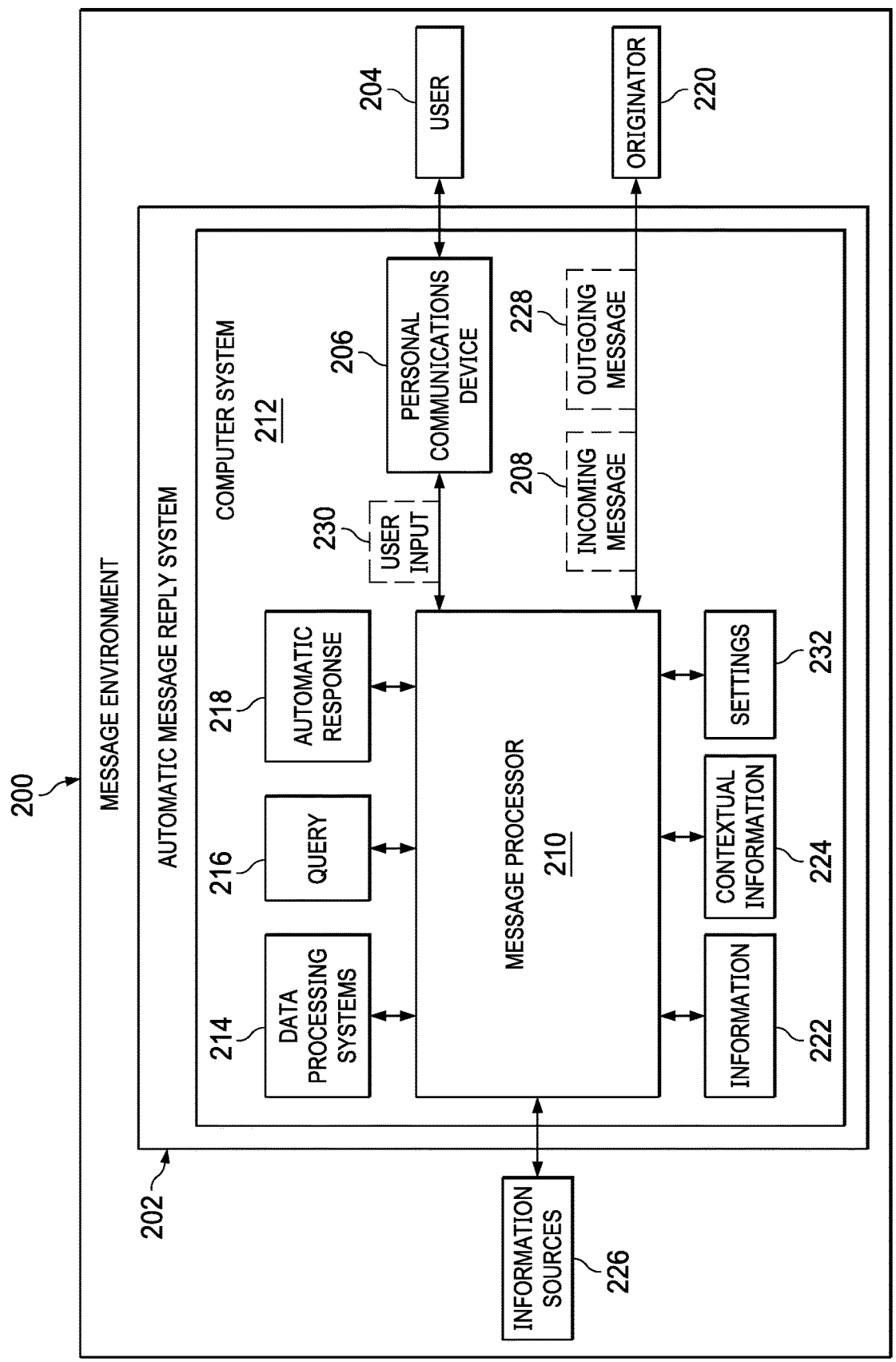
FIG. 2 is a block diagram of a messaging environment in accordance with an illustrative embodiment.

With reference now to FIG. 2, a block diagram of a messaging environment is depicted in accordance with an illustrative embodiment. In this illustrative example, message environment 200 includes components that can be implemented in hardware, such as the hardware shown in network data processing system 100 in FIG. 1.

In this illustrative example, message environment 200 includes automatic message reply system 202, which operates to automatically respond to incoming messages as a service for user 204. In this illustrative example, user 204 is associated with personal communications device 206. In this illustrative example, personal communications device 206 is a physical device that has communications capabilities for exchanging communications such as text messages, voice messages, voice calls and other forms of communications for user 204. Personal communications device 206 can also be referred to as a communications device for user 204. As depicted, personal communications device 206 can be a mobile device, a mobile phone, a personal digital assistant, a tablet computer, smart glasses, a smartwatch, a laptop computer, a voice over IP phone, a desktop computer, a work station, or some other suitable personal communication device.

As depicted, automatic message reply system 202 can automatically respond to incoming message 208 that is directed to user 204 at personal communications device 206. In this illustrative example, incoming message 208 can take a number of different forms. For example, incoming message 208 can be selected from one of a voice message, a text message, a short message service message, a multimedia message service message, a chat message, an instant messaging service message, or other suitable type of message that can be received over a wired or wireless connection by personal communications device 206.

In this illustrative example, automatic message reply system 202 comprises message processor 210 in computer system 212. Message processor 210 can be implemented in software, hardware, firmware, or a combination thereof. When software is used, the operations performed by message processor 210 can be implemented in program code configured to run on hardware, such as a processor unit. When firmware is used, the operations performed by message processor 210 can be implemented in program code and data and stored in persistent memory to run on a processor unit. When hardware is employed, the hardware may include circuits that operate to perform the operations in message processor 210.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 212 is a physical hardware system and includes one or more data processing systems. When more than one data processing system is present in computer system 212, those data processing systems are in communication with each other using a communications medium. The communications medium can be a network. The data processing systems can be selected from at least one of a computer, a server computer, a tablet computer, or some other suitable data processing system. In this illustrative example, computer system 212 includes personal communications device 206.

In this illustrative example, message processor 210 is located in personal communications device 206. In another illustrative example, computer system 212 can include other data processing systems in addition to personal communications device 206. With this implementation of computer system 212, message processor 210 can run on a set of data processing systems 214. In this example, the set of data processing systems 214 can include at least one of a server computer, a laptop computer, a work station, an Internet of Things device, or other suitable types of data processing systems. In yet another illustrative example, message processor 210 can be distributed and run on both personal communications device 206 and the set of data processing systems 214 in computer system 212.

As depicted, incoming message 208 is received by message processor 210 for personal communications device 206 for user 204. Message processor 210 performs natural language processing on incoming message 208 to generate query 216 in response to automatic response 218 to incoming message 208 being enabled for originator 220 of incoming message 208. In this illustrative example, originator 220 of incoming message 208 can be another user operating a communications device such as a mobile phone.

In this illustrative example, automatic response 218 can be enabled based on user input 230 selecting a group of settings 232. For example, the group of settings 232 can be a set of contacts designated to receive automatic responses. As used herein, a "group of" when used with respect to items, means one or more items. For example, a group of settings is one or more settings.

A contact can be an individual or a group containing multiple individuals. In another illustrative example, whether automatic response 218 is enabled can also be based on a group of settings 232 selected from at least one of a time of day, a day of the week, a vacation day, a sleep time, a do not disturb setting, a holiday, a location of the user, or some other suitable setting.

As another example, automatic response 218 can be enabled when user 204 is traveling in a vehicle. User 204 can be a driver or passenger in the vehicle. In this illustrative example, message processor 210 identifies information 222 responsive to query 216 and contextual information 224 related to or referring to information 222 obtained from information sources 226 using query 216 generated from the natural language processing of incoming message 208. In this illustrative example, contextual information 224 is information that refers to or is related to information 222. As depicted, information sources 226 can take a number of different forms. For example information sources 226 can be selected from at least one of a global positioning system receiver, a calendar system, a database, a collaboration website, a social networking system, a file sharing service, a file server, a navigation system, a document management system, a weather service, an enterprise social software application, a navigation application, a traffic information service, or other suitable sources of information that can be used to identify information 222 responsive to query 216 and identify contextual information 224 related to query 216.

As depicted, message processor 210 generates outgoing message 228 using information 222 and contextual information 224. In this illustrative example, outgoing message 228 is one of a voice message, a text message, a short message service (SMS) message, a multimedia message service (MMS) message, a chat message, an instant messaging service message, or some other suitable type of message. Message processor 210 sends outgoing message 228 to originator 220 of incoming message 208.

Figure 3:
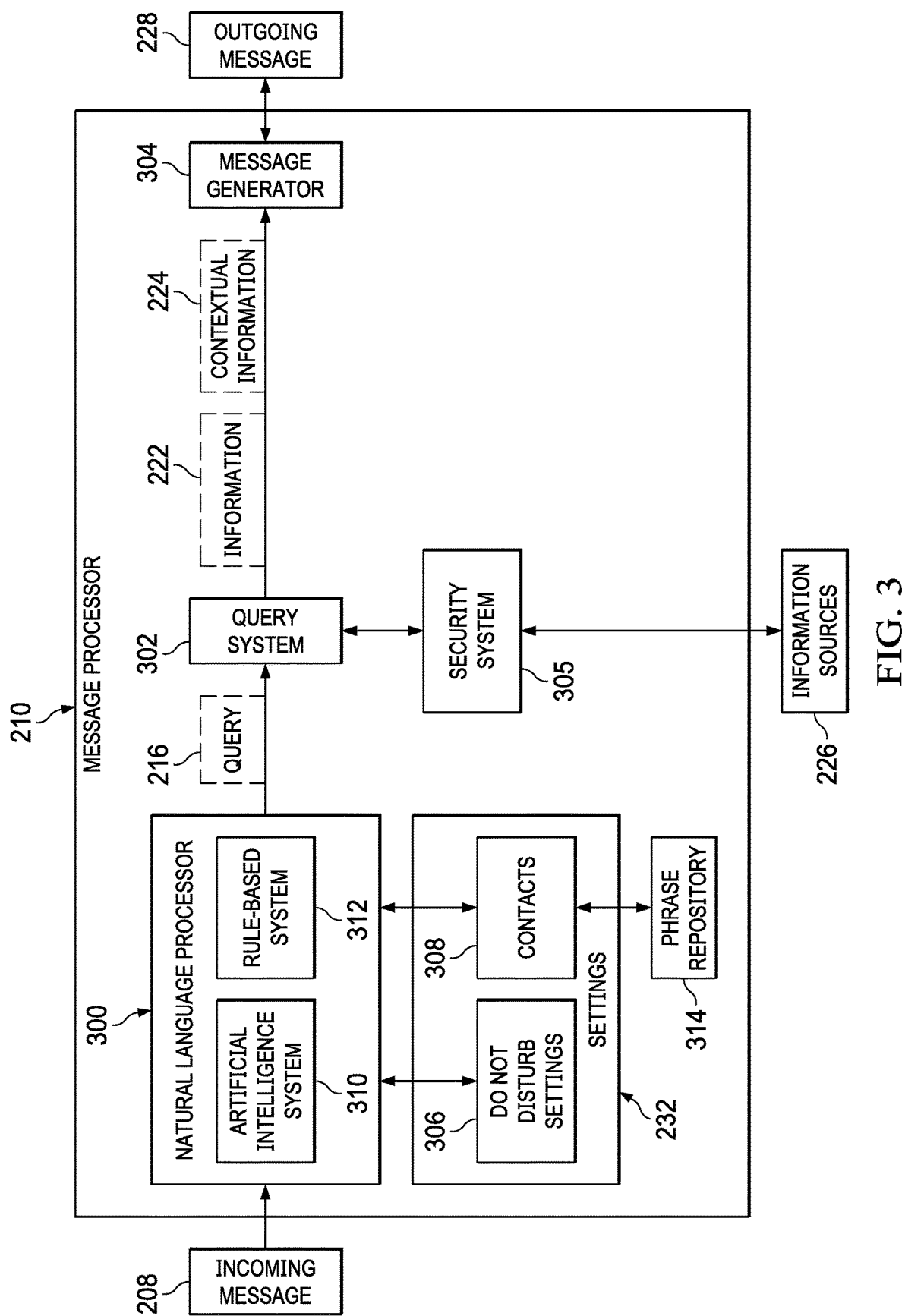
FIG. 3 is a block diagram of a message processor in accordance with an illustrative embodiment.

With reference now to FIG. 3, a block diagram of a message processor is depicted in accordance with an illustrative embodiment. In the illustrative examples, the same reference numeral may be used in more than one figure. This reuse of a reference numeral in different figures represents the same element in the different figures.

In FIG. 3, an example of components that can be used to implement message processor 210 is shown. In this illustrative example, message processor 210 includes natural language processor 300, query system 302, message generator 304, and security system 305.

In this illustrative example, natural language processor 300 receives incoming message 208. Incoming message 208 can be a voice message, a text message, an email message, an instant message, or some other suitable type of message.

Natural language processor 300 determines whether to process incoming message 208. As depicted, this determination is made by checking settings 232 set by user 204. In this illustrative example, settings 232 indicate if and when automatic responses to incoming messages are to be generated. As depicted, settings 232 can include at least one of a set of do not disturb settings 306, a set of contacts 308, or other suitable settings. For example, the set of do not disturb settings 306 can include one or more settings that indicate when automatic responses should or should not be generated.

For example, the set of do not disturb settings 306 can include times such as sleeping hours, weekends, holidays, vacation days, or other types of time periods. Further, the set of do not disturb settings 306 can include an absolute do not disturb indication in which automatic responses are not generated regardless of other conditions.

In this illustrative example, the set of contacts 308 can be one or more contacts that indicate what people should receive automatic responses. These contacts can be selected by user 204. The set of contacts 308 can also include what people should not receive automatic responses. A contact can be for an individual or for a group.

When automatic responses are enabled, natural language processor 300 processes incoming message 208 to generate query 216. In this illustrative example, query 216 is one or more questions and are in a form that can be used by software to search for information that is responsive to the questions. In one illustrative example, when incoming message 208 is a voice message, the audio voice message can be processed using speech to text processes to generate text from the voice message. This text can then be processed to generate query 216.

Natural language processor 300 can include, for example, artificial intelligence system 310. Artificial intelligence system 310 is a system that has intelligent behavior and can be based on the function of the human brain. An artificial intelligence system comprises at least one of an artificial neural network, a Bayesian network, a fuzzy logic, an expert system, a natural language system, a cognitive system, or some other suitable system. Machine learning is used to train the artificial intelligence system. Machine learning involves inputting data to the process and allowing the process to adjust and improve the function of the artificial intelligence system. A cognitive system is a computing system that mimics the function of a human brain.

In this illustrative example, artificial intelligence system 310 can implement natural language processing that uses at least one of natural language understanding, syntax, semantics, or discourse.

In another illustrative example, natural language processor 300 can use rule-based system 312 in place of or in addition to artificial intelligence system 310 to generate query 216. For example, rule-based system 312 can access phrase repository 314. As depicted, phrase repository 314 includes frequently used questions or expected questions such as, for example, "Where are you?", "What time will you reach the office?", "When will you be available?", and other phrases.

Rule-based system 312 can include a set of rules that may define grammar or heuristic rules stemming. Rule-based system 312 can take up less storage resources and provide an ability to quickly generate query 216 when commonly used phrases from phrase repository 314 are present in incoming message 208.

Natural language processor 300 sends query 216 to query system 302. Query system 302 accesses information sources 226 to identify information 222 responsive to query 216. Further, query system 302 also accesses information sources 226 to identify contextual information 224.

In this example, access to information sources 226 can be controlled to provide security for the information in information sources 226. As depicted, security system 305 can be used to determine which of information sources 226 can be used to identify information 222 and contextual information 224.

In this example, different originators of incoming messages can be allowed to receive different information. For example, a first originator may be allowed to receive information from a calendar application and a project database while a second originator may be allowed to receive information from the calendar application but not the project database.

Security system 305 determines which of information sources 226 a particular originator of an incoming message is enabled for to access the information in these information sources and retrieve information 222 needed to be responsive to query 216 and contextual information 224 referring to or related to information 222. For example, if incoming message 208 is a voice message from a call made by originator 220, security system 305 can check the mobile number for incoming message 208 against contacts designated by user 204. If this mobile number is enabled and has passed authentication, security system 305 can allow query system 302 to access a group of information sources 226 that are designated as enabled for access for originator 220. In this example, originator 220 is a contact that is allowed access to the group of information sources 226 selected for this contact. Further, security system 305 can also use an encrypted security token or certificate to validate the security check against the incoming phone number.

In this illustrative example, query system 302 sends information 222 and contextual information 224 to message generator 304. As depicted, message generator 304 uses this information to generate outgoing message 228.

As depicted, the processing of incoming message 208 to generate outgoing message 228 is performed automatically by different components within message processor 210 when automatic response 218 to incoming message 208 is enabled. In other words, user input is not needed to select a response or determine whether to respond to incoming message 208 when incoming message 208 is received for user 204.

Additionally, in the different illustrative examples, at least one of messages received from users, information about users, or other information considered by users to be confidential, private, or protected is only received or used with user consent. For example, at least one of settings 232, contacts 308, information sources 226, or other information about or for users are handled by automatic reply system 202 following privacy rules and regulations.

In the illustrative examples, this information is not used without user opt-in consent. For example, the information is not collected or used unless a user has opted in and voluntarily consented to use of this information and other protected information ahead of time with the proper disclosure and consent forms that follow privacy rules and regulations. In the illustrative example, information is not collected, shared, or otherwise used unless a user has opted in to consent to the user of information for the user. This information can include at least one of a calendar entry, a location of the user, a travel plan, travel route, meeting information, project information, client data, images, video data, audio data, or other information that is considered personal and confidential information to the user.

In one illustrative example, one or more illustrative examples are present that overcome a technical problem with automatically responding to incoming messages in a desired manner such that selected originators of incoming messages can receive desired responses. As a result, one or more illustrative examples enable automatically responding to incoming messages in which the response answers questions in the messages without requiring user input.

Computer system 212 can be configured to perform at least one of the steps, operations, or actions described in the different illustrative examples using software, hardware, firmware, or a combination thereof. As a result, computer system 212 operates as a special purpose computer system in which message processor 210 in computer system 212 enables automatically responding to incoming messages with information that can be tailored to particular originators of the incoming messages. In particular, message processor 210 transforms computer system 212 into a special purpose computer system as compared to currently available general computer systems that do not have message processor 210.

In the illustrative example, the use of message processor 210 in computer system 212 integrates processes into a practical application for a method for responding to an incoming message that increases the performance of a personal communications device for a user. In other words, message processor 210 in computer system 212 is directed to a practical application of a process integrated into message processor 210 in computer system 212 that receives an incoming message for a personal communications device and processes the incoming message to generate a query in response to an automated response for the incoming message being enabled for the originator of the incoming message. Information and contextual information identified using the query, and an outgoing message is generated using the information and contextual information. The outgoing message is sent to the originator of the incoming message.

These different steps are performed using message processor 210 in a manner that avoids user input from a user when an incoming message is received. For example, a user on a current call can continue the call without having to divert attention to select a preprogrammed text message when an incoming call is received. Instead, incoming calls are received as an incoming message and processed to generate a response that can be tailored to the originator of the incoming message. Graphical user interfaces are provided to a user to input settings for which originators of calls should receive automatic responses and what sources of information can be accessed in generating responses.

The illustration of message environment 200 and the different components in FIGS. 2-3 are not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, message processor 210 is shown as a single block. The different functions performed by message processor 210 can be distributed across multiple personal communications devices for a user, or distributed on server computers or other data processing systems that can handle these functions for multiple users and their personal communications devices. In another illustrative example, security system 305 in FIG. 3 can be omitted from message processor 210 in some illustrative examples.

FIGS. 4-7 are illustrations of graphical user interfaces that can be displayed to a user for configuring options in a message processor. In the illustrative examples, the different graphical user interfaces in these figures can be displayed on a display system in personal communications device 206 or some other data processing system in data processing systems 214 in computer system 212 for user 204 in FIG. 2.

In this illustrative example, a display system in the illustrative example is a physical hardware system and includes one or more display devices on which a graphical user interface can be displayed. The display devices may include at least one of a light emitting diode (LED) display, a liquid crystal display (LCD), an organic light emitting diode (OLED) display, a computer monitor, a projector, a flat panel display, a heads-up display (HUD), or some other suitable device that can output information for the presentation of information.

Figure 4:
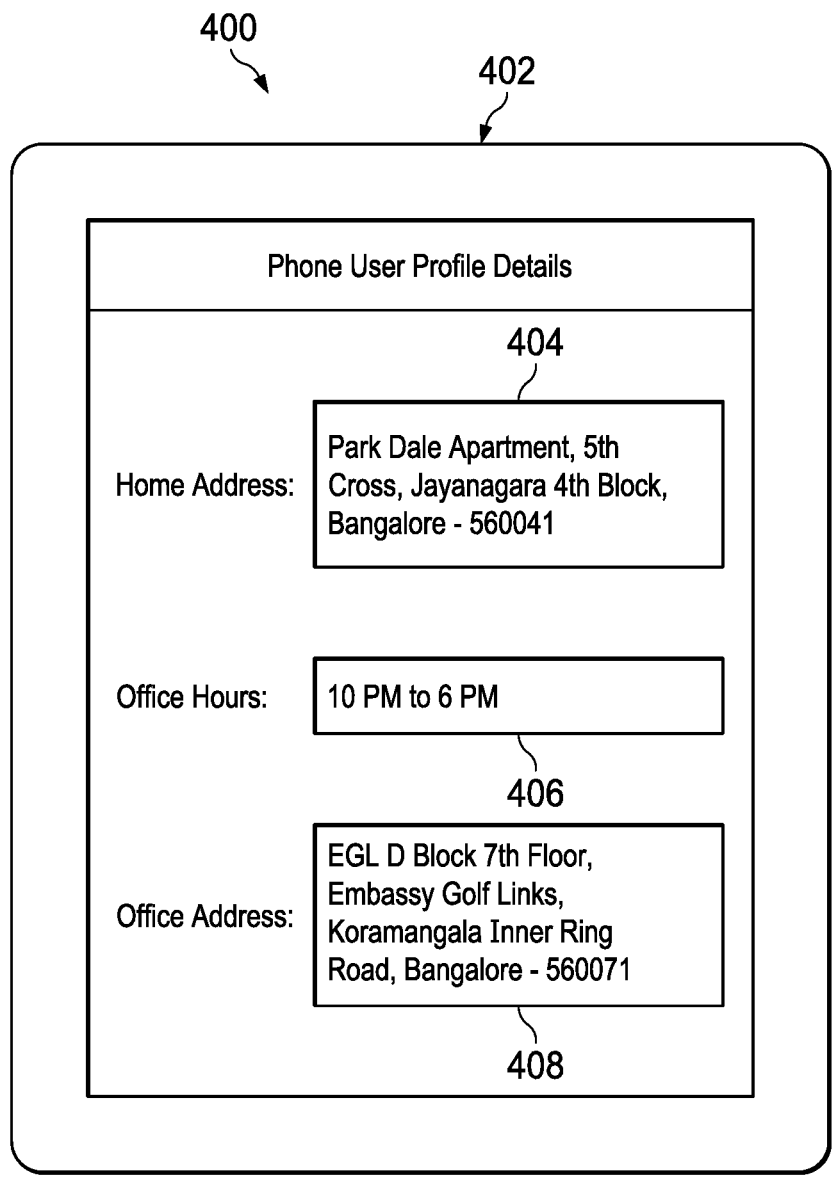
FIG. 4 is an illustration of a graphical user interface for setting user profile information in accordance with an illustrative embodiment.

Turning to FIG. 4, an illustration of a graphical user interface for setting user profile information is depicted in accordance with an illustrative embodiment.

In this illustrative example, graphical user interface 400 displays profile setting page 402. As depicted, profile setting page 402 enables user 204 to enter information about user 204. In this depicted example, profile setting page 402 includes a number of sections for entering profile information. In this example, the sections include home address 404, office hours 406, and office address 408.

The information entered into profile setting page 402 can be used by the message processor 210 for determining contextual information, such as a destination location towards which user 204 is travelling to and at what time. For example, around 9.30 AM, user 204 travels towards the office and in the evening and after 6:00 PM, user 204 travels towards home. If an originator of an incoming message queries where user 204 is located, the information is the location of user 204 and the contextual information is the direction of travel, a route, and destination for user 204.

Figure 5:
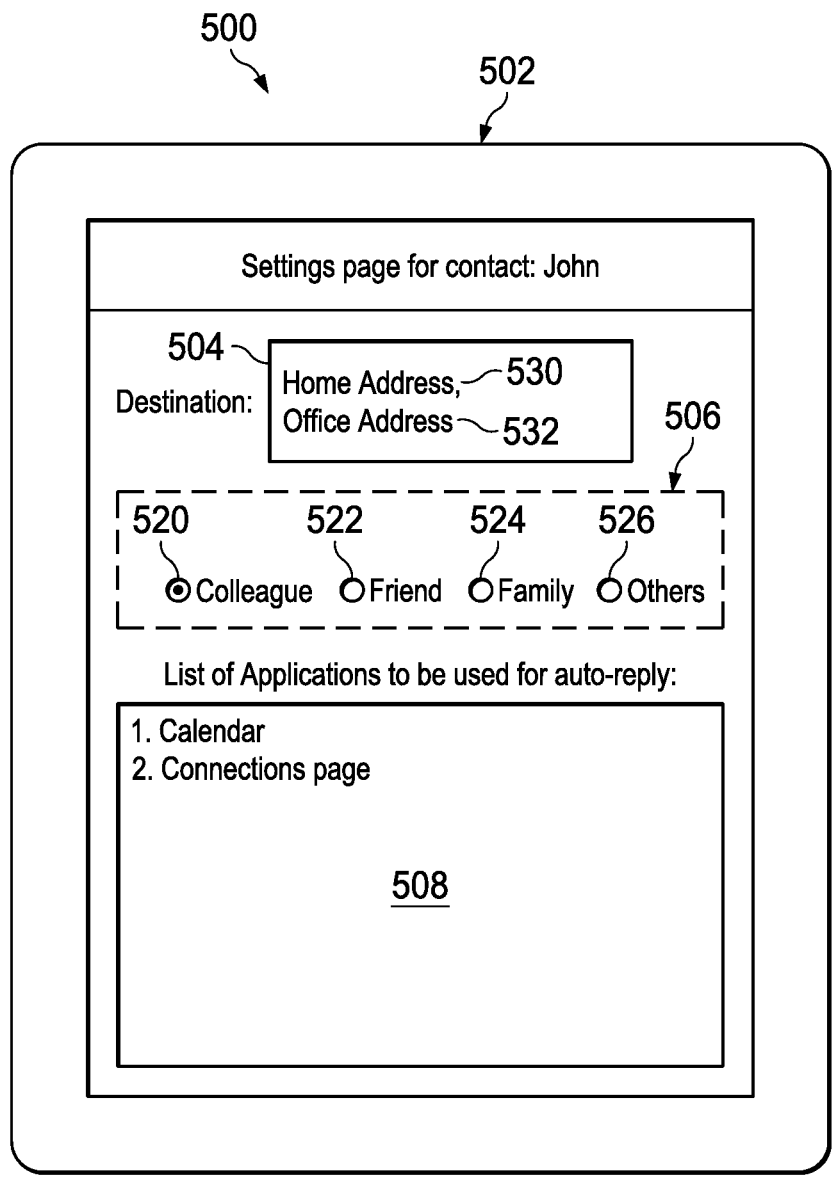
FIG. 5 is an illustration of a graphical user interface for setting contact and access information in accordance with an illustrative embodiment.

Next in FIG. 5, an illustration of a graphical user interface for setting contacts is depicted in accordance with an illustrative embodiment. As depicted, graphical user interface 500 displays contact settings page 502. In this illustrative example, contact settings page 502 receives user input specifying information for each contact that is enabled for automatic responses. In other words, contact settings page 502 is used to input information for a particular contact for which automatic responses are to be generated by message processor 210 when incoming messages are received from the contact and user 204 is unavailable.

As depicted, contact settings page 502 includes destination 504, contact type 506, and applications 508. Destination 504 can include destination information for user 204. In this example, destination 504 includes home address 530 and office address 532. A particular location can be determined based on the time of day and schedule set by the user. This information can be used to indicate the destination that user 204 is heading towards from the current location of user 204. This information can also be used to determine the time needed by user 204 to reach a destination from the current location of user 204.

In this illustrative example, contact type 506 can be used to identify what category of people in contacts should be enabled for auto-responses. In this illustrative example, contact type 506 includes colleague 520, friend 522, family 524, and others 526. In this illustrative example, contact type 506 is colleague 520.

As depicted, contact type 506 can be used by message processor 210 to determine when automatic responses are enabled for a particular contact. For example, automatic responses may be enabled for friends and family during the weekend. On the other hand, automatic responses may be enabled for colleagues only during certain hours of a work week.

In this illustration, applications 508 are examples of information sources 226. Applications 508 are software applications that can be accessed or that can identify information responsive to a query and contextual information for use in generating an outgoing message for an automatic response when an incoming message sent by the contact is received. In this example, the applications that can be used to identify information and contextual information are a calendar application and a connections page. In the illustrative example, some information sources are default information sources that can be used for every contact. For example, position information from a global positioning system receiver is an example of an information source that can be a default information source.

Figure 6:
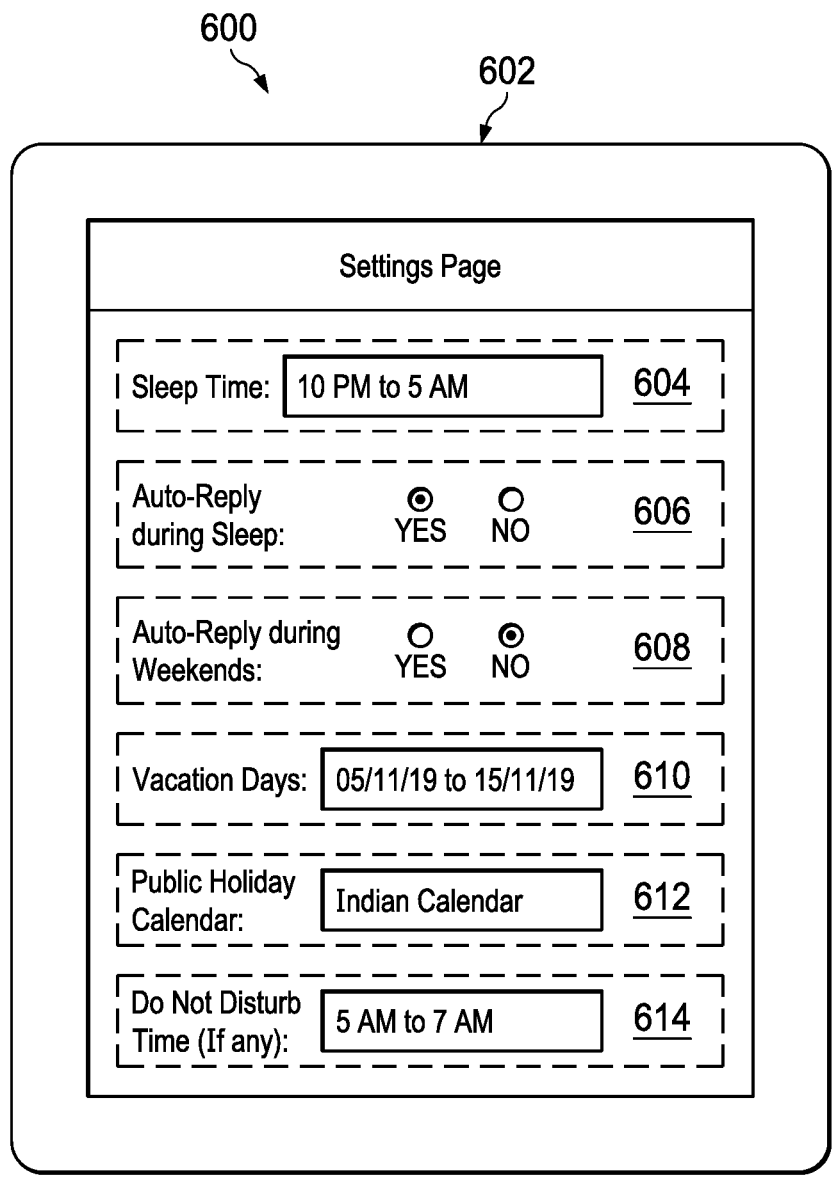
FIG. 6 an illustration of a graphical user interface for receiving user settings in accordance with an illustrative embodiment.

Turning next to FIG. 6, an illustration of a graphical user interface for receiving user settings is depicted in accordance with an illustrative embodiment. In this depicted example, graphical user interface 600 displays user settings page 602. As depicted, user settings page 602 enables user 204 to enter settings for when auto-responses are enabled for user 204.

In this illustrative example, user settings page 602 includes sleep time 604, auto-reply during sleep 606, auto-reply during weekends 608, vacation days 610, public holiday calendar 612, and do not disturb time 614.

In this illustrative example, sleep time 604 indicates when user 204 is expected to be asleep. Auto-reply during sleep 606 can be used indicate whether automatic responses will be generated during sleep time 604. In this example, sleep time 604 is the time period from 10:00 PM to 5:00 AM, and automatic responses are enabled during this time in auto-reply during sleep 606.

As depicted, auto-reply during weekends 608 is used to indicate whether automatic responses will be sent during weekends for user 204. In this depicted example, automatic responses are disabled during weekends. Vacation days 610 and public holiday calendar 612 are used to identify vacation days and holidays. In this example, automatic responses can be disabled during vacation days and holidays. Additionally, do not disturb time 614 enables user 204 to disable automatic responses during this time. In this example, do not disturb time 614 has a time period from 5:00 AM to 7:00 AM.

Further, during sleep time 604, message processor 210 will not respond to questions such as "Where are you?" & similar questions. Message processor 210 can be configured to respond only to questions such as "What are the LDAP environment details for the customer PMR?", "What are call-in details for the meeting with Australian customer at 5:00 AM?", and other similar questions.

Figure 7:
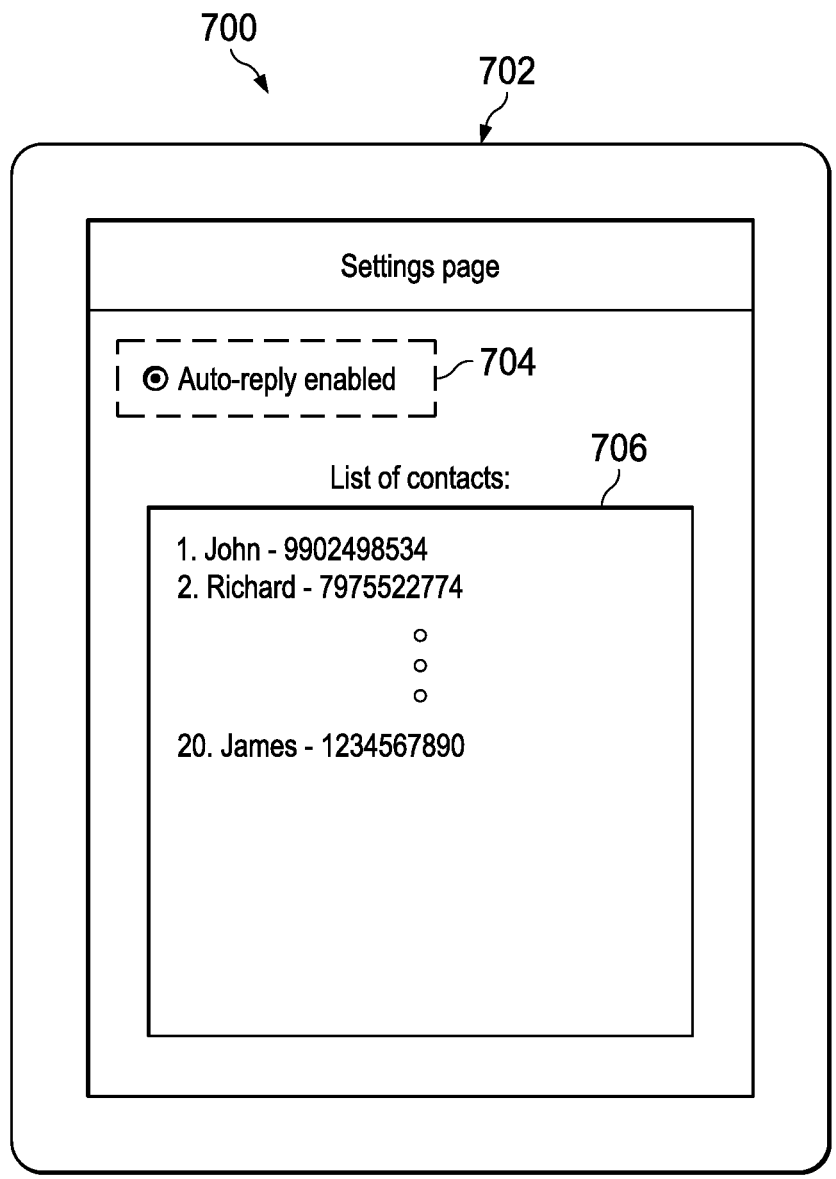
FIG. 7 is an illustration of a graphical user interface for selecting contacts in accordance with an illustrative embodiment.

With reference next to FIG. 7, an illustration of a graphical user interface for selecting contacts is depicted in accordance with an illustrative embodiment. As depicted, graphical user interface 700 displays user settings page 702. In this example, settings page 702 includes auto-reply enabled 704 and list of contacts 706. When auto-reply enabled 704 is selected, automatic responses are generated for a set of contacts for user 204. In this illustrative example, the set of contacts are identified in list of contacts 706. From list of contacts 706, individual contacts can be selected and further details, such as what applications can be accessed for a particular user, can be made using contact settings page 502 in FIG. 5.

Figure 8:
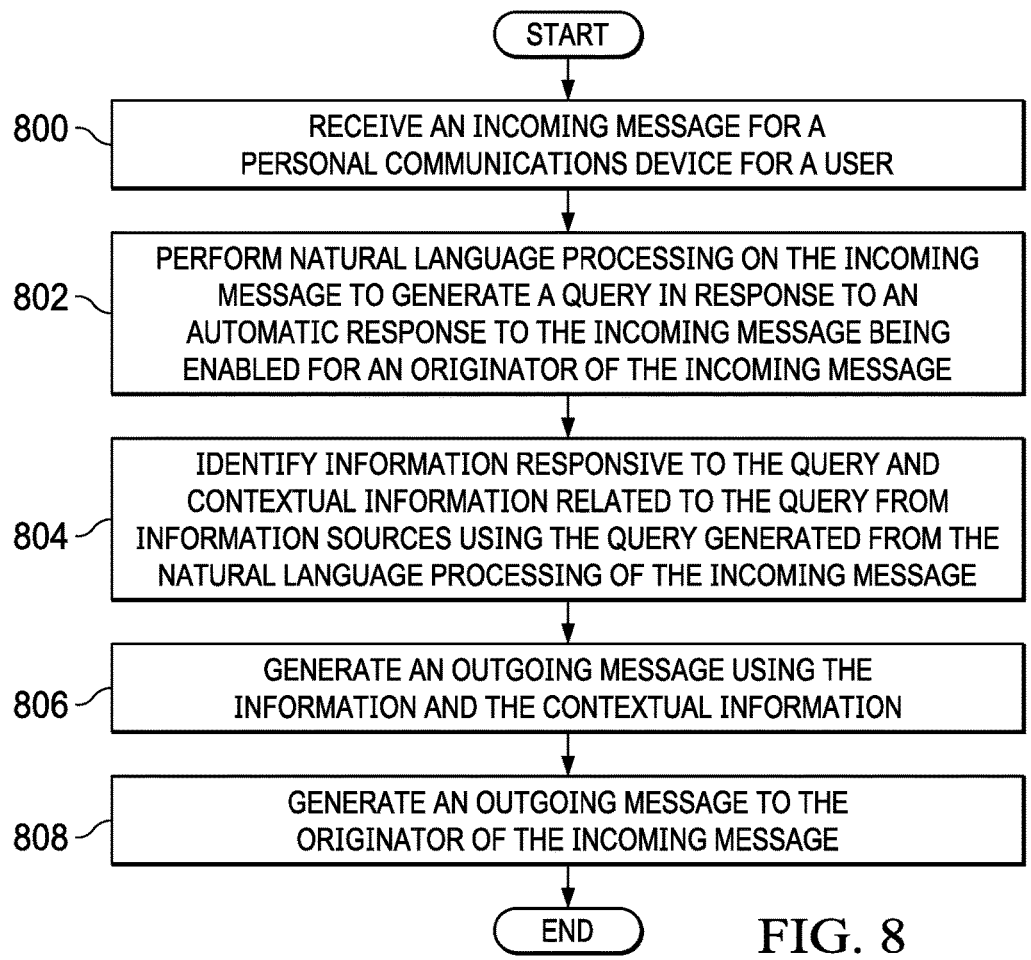
FIG. 8 is a flowchart of a process for responding to an incoming message in accordance with an illustrative embodiment.

Turning next to FIG. 8, a flowchart of a process for responding to an incoming message is depicted in accordance with an illustrative embodiment. The process in FIG. 8 can be implemented in hardware, software, or both. When implemented in software, the process can take the form of program code that is run by one or more processor units located in one or more hardware devices in one or more computer systems. For example, the process can be implemented in message processor 210 in computer system 212 in FIG. 2.

The process begins by receiving an incoming message for a personal communications device for a user (step 800). The process performs natural language processing on the incoming message to generate a query in response to an automatic response to the incoming message being enabled for an originator of the incoming message (step 802).

The process identifies information responsive to the query and contextual information related to the query from information sources using the query generated from the natural language processing of the incoming message (step 804). The process generates an outgoing message using the information and the contextual information (step 806). The process sends the outgoing message to the originator of the incoming message (step 808). The process terminates thereafter.

Figure 9:
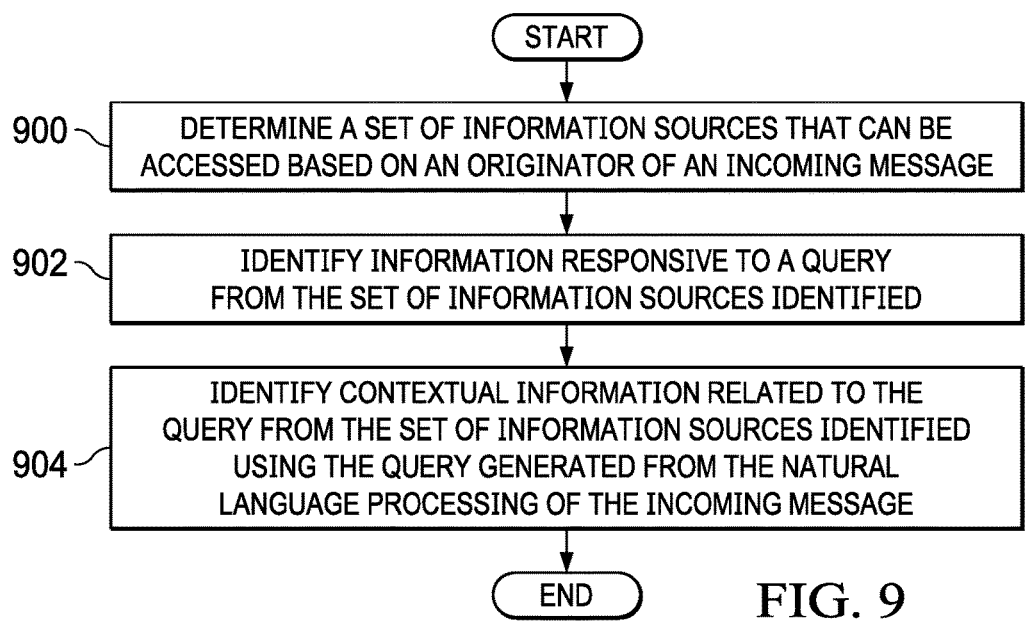
FIG. 9 is a flowchart of a process for identifying information responsive to the query and the contextual information related to the query from the information sources in accordance with an illustrative embodiment.

With reference next to FIG. 9, a flowchart of a process for identifying information responsive to a query and contextual information related to the query from information sources is depicted in accordance with an illustrative embodiment. The process in FIG. 9 is an example of one manner in which step 804 in FIG. 8 can be implemented. The process can be implemented in security system 305 in message processor 210 as depicted in FIG. 3.

The process begins by determining a set of information sources that can be accessed based on an originator of an incoming message (step 900). In step 900, a particular originator of an incoming message may be enabled or allowed to receive information that is located in the set of information sources. For example, the particular originator may be allowed to receive information from a calendar application for the user in the information sources but is not allowed to receive information from a project database. A message processor is enabled to access these applications and retrieve the required information and generate an outgoing message with needed information to the question in the incoming message.

The process identifies information responsive to a query from the set of information sources identified (step 902). The process identifies contextual information related to the query from the set of information sources identified using the query generated from the natural language processing of the incoming message (step 904). The process terminates thereafter.

Figure 10:
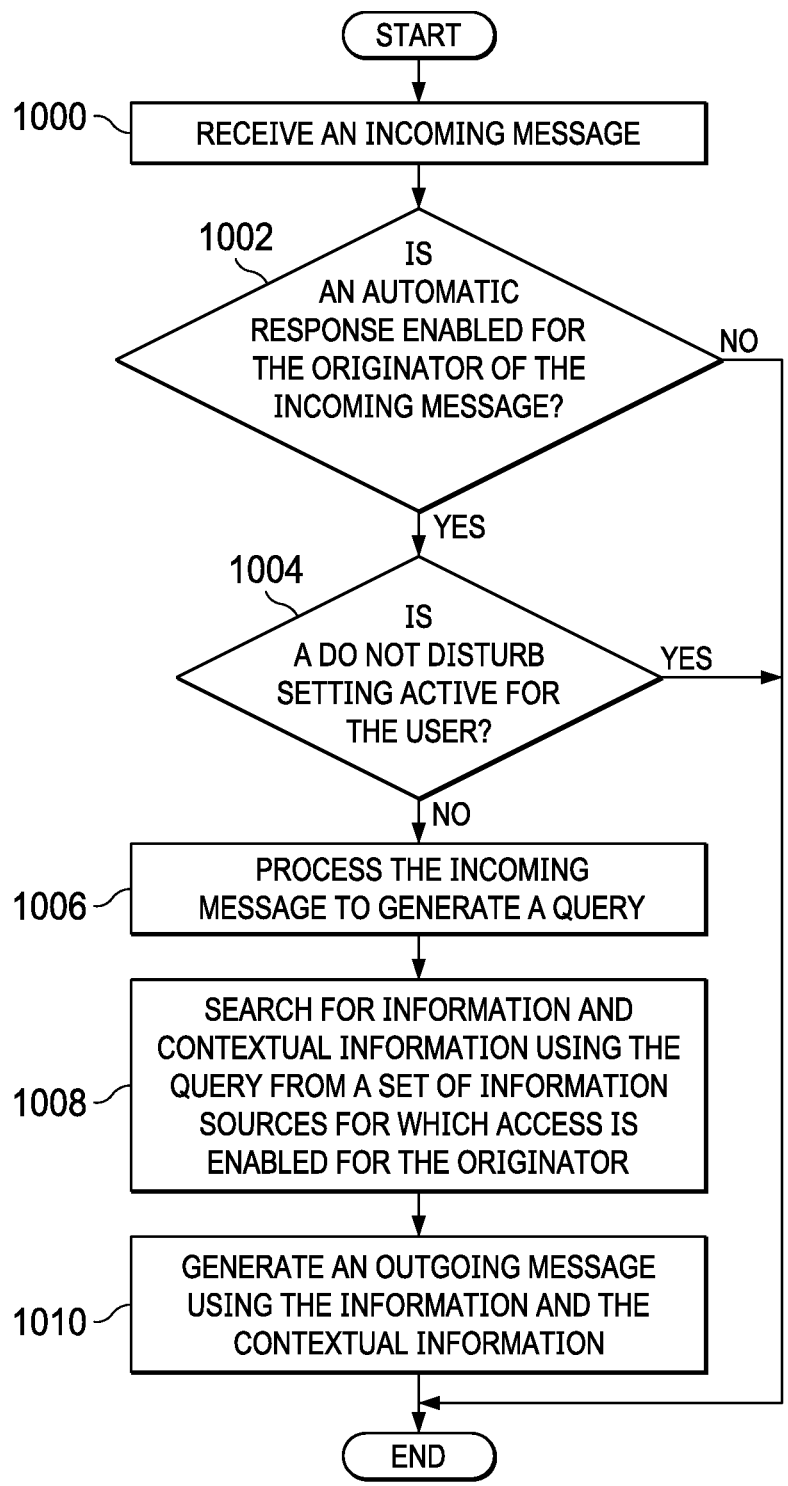
FIG. 10 is a flowchart of a process for responding to an incoming message in accordance with an illustrative embodiment.

Turning next to FIG. 10, a flowchart of a process for responding to an incoming message is depicted in accordance with an illustrative embodiment. The process in FIG. 10 can be implemented in hardware, software, or both. When implemented in software, the process can take the form of program code that is run by one or more processor units located in one or more hardware devices in one or more computer systems. For example, the process can be implemented in message processor 210 in computer system 212 in FIG. 2.

The process begins by receiving an incoming message (step 1000). The incoming message can be, for example, a phone call, a text message, or some other suitable type of message that can be received by a personal communications device.

The process determines whether an automatic response is enabled for the originator of the incoming message (step 1002). In step 1002, the determination can be made by comparing the identity of the originator against a set of contacts that have been designated by the user as enabled to receive an automatic response. The phone number or other identifier in the incoming message can be compared against the phone numbers for the set of contacts to determine whether an automatic response is enabled for the originator of the incoming message.

If an automatic response is enabled for the originator of the incoming message, a determination is made as to whether a do not disturb setting is active for the user (step 1004). In step 1004, the do not disturb setting can be from do not disturb settings 306 in FIG. 3. If a do not disturb setting is not active, the process processes the incoming message to generate a query (step 1006). The process then searches for information and contextual information using the query from a set of information sources for which access is enabled for the originator (step 1008).

The process generates an outgoing message using the information and the contextual information (step 1010). The process terminates thereafter.

In one example, if the incoming message is a voice call asking where the user is, the process in step 1008 can identify the current location of the user from an information source, such as a global positioning system receiver in the mobile phone of the user, identify the location of the caller, and identify the distance between the user and the caller. The process can generate an outgoing message in the form of a text message and send the text message back to the caller.

In another example, if the incoming message is a text message requesting customer details for a particular customer, the process can identify information responsive to the request for the customer details and contextual information from a calendar application and a customer database for the user. The process can then generate an outgoing message in the form of a text message or a voice message to the originator of the text message.

With reference again to step 1002, if an automatic response is not enabled for the originator of the incoming message, the process terminates. With reference again to step 1004, if a do not disturb setting is active for the user, the process also terminates.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

With the different components and the processes illustrated in FIGS. 1-10, automatic responses to incoming messages can be provided in many different situations. For example, a colleague of a user is waiting for a meeting at the office at 12:00 PM. The user is on the way to the office in traffic that is slower than usual. The colleague calls and texts the user to determine whether the meeting should be postponed or canceled. In this situation, the message processor can automatically determine that the user is driving towards the office and will reach the office prior to the meeting time. The time that the user will reach the office is information responsive to the question. The information about traffic and travel to the office is contextual information that is related to the time at which the user will reach the office for the meeting. This information can be used to generate an outgoing message that is sent to the colleague.

In another illustrative example, a colleague messages the user to obtain details for a meeting. The incoming message can be, for example, "What are the call-in and passcode details for the meeting with the US team at 8:00 PM?"

The message processor can process the incoming message using natural language processing to understand what information is being requested. In this illustrative example, the processing of the incoming message can be used to generate a query. In this example, the query is to search for call-in information including a passcode for the meeting.

The message processor can determine that the originator of the message is a contact and that the originator is a contact that can receive meeting information. The message processor then accesses a calendar for the user and identifies a meeting invite at 8:00 PM. The message processor can also identify the meeting information when it is determined that the calendar shows the correct meeting at that time. This meeting information is the information that is responsive to the query identified from the incoming message.

Further, the message processor can also access the current location of the user and the travel time for the user to reach the office for the meeting. In this example, message processor determines that the user is unable reach the office in time for the meeting. This information is contextual information that is related to the meeting. The message processor generates an outgoing message such as "I am in heavy traffic and will not reach the office in time for the 8:00 PM meeting. The call-in details are 000-117 888-426-6820 and the passcode is 12345678".

In still another illustrative example, a colleague may send an incoming message such as "What are the cluster environment details that you were working on yesterday?" In response to this incoming message, the message processor can generate a query from the incoming message using natural language processing. The message processor can also validate that the message is from the colleague using the phone number associated with the incoming message and the phone number in contact information for the colleague. In this example, the query is a structured form of the question from the colleague that can be processed by the message processor.

The message processor can determine whether access to the information source with the information on the cluster environment details can be shared with the colleague. When a determination is made that the information can be shared with the colleague, the message processor accesses the information source, which is the repository accessed by a social software application in this example. For example, the message processor can implement a keyword search such as "LDAP Environment" to search for the information. Additionally, the message processor can also perform a search for contextual information such as the customer for which the work is being performed. In this example, the customer can be "PMR 1234".

The message processor can obtain information from the repository that is responsive to the query. The message processor can generate an outgoing message with information such as "The primary node is on xyz.in.ibm.com machine. The secondary node is on abc.in.ibm.com machine. The root password for both of the machines is root 1234. This work is being performed for PMR 1234".

Figure 11:
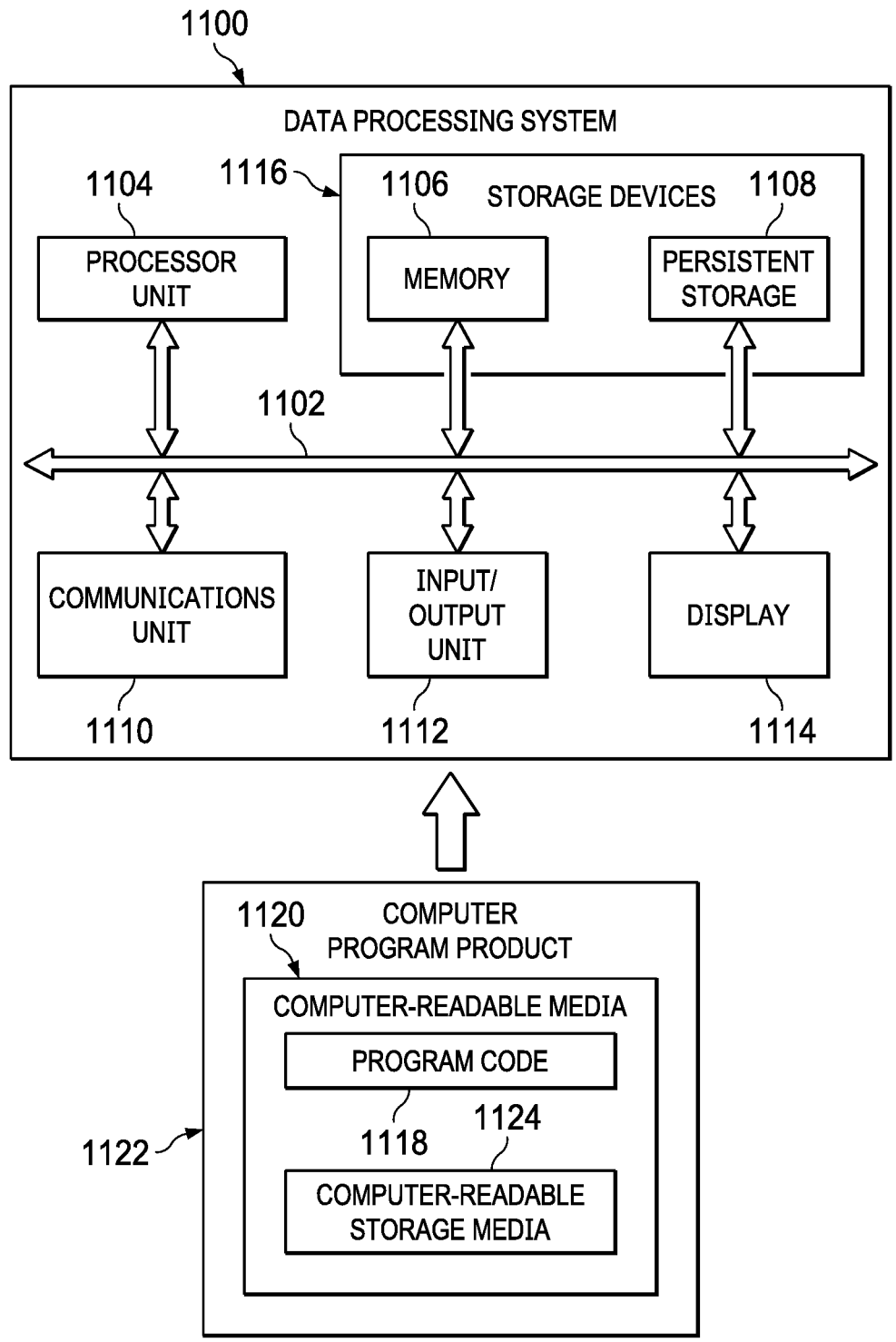
FIG. 11 is a block diagram of a data processing system in accordance with an illustrative embodiment.

Turning now to FIG. 11, a block diagram of a data processing system is depicted in accordance with an illustrative embodiment. Data processing system 1100 can be used to implement server computer 104, server computer 106, and client devices 110 in FIG. 1. Data processing system 1100 can also be used to implement computer system 212, personal communications device 206, and data processing systems 214 in FIG. 2. In this illustrative example, data processing system 1100 includes communications framework 1102, which provides communications between processor unit 1104, memory 1106, persistent storage 1108, communications unit 1110, input/output (I/O) unit 1112, and display 1114. In this example, communications framework 1102 takes the form of a bus system.

Processor unit 1104 serves to execute instructions for software that can be loaded into memory 1106. Processor unit 1104 includes one or more processors. For example, processor unit 1104 can be selected from at least one of a multicore processor, a central processing unit (CPU), a graphics processing unit (GPU), a physics processing unit (PPU), a digital signal processor (DSP), a network processor, or some other suitable type of processor. For example, further, processor unit 1104 can may be implemented using one or more heterogeneous processor systems in which a main processor is present with secondary processors on a single chip. As another illustrative example, processor unit 1104 can be a symmetric multi-processor system containing multiple processors of the same type on a single chip.

Memory 1106 and persistent storage 1108 are examples of storage devices 1116. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1116 may also be referred to as computer-readable storage devices in these illustrative examples. Memory 1106, in these examples, can be, for example, a random-access memory or any other suitable volatile or non-volatile storage device. Persistent storage 1108 may take various forms, depending on the particular implementation.

For example, persistent storage 1108 may contain one or more components or devices. For example, persistent storage 1108 can be a hard drive, a solid-state drive (SSD), a flash memory, a rewritable optical disk, a rewritable magnetic tape, or some combination of the above. The media used by persistent storage 1108 also can be removable. For example, a removable hard drive can be used for persistent storage 1108.

Communications unit 1110, in these illustrative examples, provides for communications with other data processing systems or devices. In these illustrative examples, communications unit 1110 can be a network interface card. When data processing system 1100 is a personal communications device, communications unit 1110 can be a wireless communications device that provides for communications using wireless signals selected from at least one of wi-fi signals, Bluetooth signals, cellular signals and other suitable types of wireless signals that can be used for wireless communications.

Input/output unit 1112 allows for input and output of data with other devices that can be connected to data processing system 1100. For example, input/output unit 1112 may provide a connection for user input through at least one of a keyboard, a mouse, or some other suitable input device. Further, input/output unit 1112 may send output to a printer. Display 1114 provides a mechanism to display information to a user.

Instructions for at least one of the operating system, applications, or programs can be located in storage devices 1116, which are in communication with processor unit 1104 through communications framework 1102. The processes of the different embodiments can be performed by processor unit 1104 using computer-implemented instructions, which may be located in a memory, such as memory 1106.

These instructions are referred to as program code, computer usable program code, or computer-readable program code that can be read and executed by a processor in processor unit 1104. The program code in the different embodiments can be embodied on different physical or computer-readable storage media, such as memory 1106 or persistent storage 1108.

Program code 1118 is located in a functional form on computer-readable media 1120 that is selectively removable and can be loaded onto or transferred to data processing system 1100 for execution by processor unit 1104. Program code 1118 and computer-readable media 1120 form computer program product 1122 in these illustrative examples. In the illustrative example, computer-readable media 1120 is computer-readable storage media 1124.

In these illustrative examples, computer-readable storage media 1124 is a physical or tangible storage device used to store program code 1118 rather than a medium that propagates or transmits program code 1118.

Alternatively, program code 1118 can be transferred to data processing system 1100 using a computer-readable signal media. The computer-readable signal media can be, for example, a propagated data signal containing program code 1118. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 1100 are not meant to provide architectural limitations to the manner in which different embodiments can be implemented. In some illustrative examples, one or more of the components may be incorporated in or otherwise form a portion of, another component. For example, memory 1106, or portions thereof, may be incorporated in processor unit 1104 in some illustrative examples. The different illustrative embodiments can be implemented in a data processing system including components in addition to or in place of those illustrated for data processing system 1100. Other components shown in FIG. 11 can be varied from the illustrative examples shown. The different embodiments can be implemented using any hardware device or system capable of running program code 1118.

Thus, the illustrative embodiments of the present invention provide a computer implemented method, computer system, and computer program product for responding to an incoming message. The incoming message is received by a computer system. A query is generated by the computer system performing natural language processing, by the computer system, on the incoming message to in response to an automatic response to the incoming message being enabled for an originator of the incoming message. Information responsive to the query and contextual information related to the query from information sources are identified by the computer system using the query generated from the natural language processing of the incoming message. An outgoing message is generated by the computer using the information and the contextual information. The outgoing message is sent by the computer system to the originator of the incoming message.

One or more illustrative examples enable providing information that is specific or relevant to a particular originator of incoming message. Additionally, the illustrative examples can provide contextual information that is related to or refers to the information that is needed by the original. In one illustrative example, a user avoids needing to answer a call while driving right and does not have to select a messaging option for the text response during the current call. Further, the illustrative example avoids an originator of the message having to wait on the user to provide the needed information. In the illustrative examples, the user can set various options that determine when automatic responses are provided.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for responding to an incoming message, the method comprising:

receiving, by a computer system, the incoming message;

performing natural language processing, by the computer system, on the incoming message to identify requested information and to generate a query for the requested information in response to an automatic response to the incoming message being enabled for an originator of the incoming message;

identifying, by the computer system, information responsive to the query and contextual information related to the query from information sources using the query generated from the natural language processing of the incoming message;

generating, by the computer system, an outgoing message using the information identified responsive to the query and the contextual information related to the query; and sending, by the computer system, the outgoing message to the originator of the incoming message, wherein the natural language processing is performed by a natural language processor of the computer system to generate the query, and further comprising:

determining, by the natural language processor of the computer system, whether the automatic response to the incoming message is enabled for the originator based on a set of contacts designated to receive automatic responses, wherein the automatic response being enabled for the originator indicates that the natural language processing is to be performed on the incoming message to generate the query, wherein the information sources are selected from at least one of a global positioning system receiver, a calendar system, a database, a collaboration website, a social networking system, a file sharing service, a file server, a navigation system, a document management system, a weather service, an enterprise social software application, or a traffic information service, and further comprising:
sending, by the natural language processor of the computer system, the query to a query system of the computer system that accesses the information sources to identify the information.

2. The method of claim 1, wherein the automatic response to the incoming message is enabled for the originator when the user is traveling in a vehicle, wherein the automatic response being enabled indicates that the natural language processing is to be performed on the incoming message to generate the query.

3. The method of claim 1 further comprising:
receiving, by the computer system, a user input selecting a group of settings for enabling the automatic response to the incoming message, wherein the automatic response being enabled indicates that the natural language processing is to be performed on the incoming message to generate the query.

4. The method of claim 1, wherein identifying, by the computer system, the information responsive to the query and the contextual information related to the information obtained from the information sources using the query generated from the natural language processing of the incoming message comprises:
determining, by the computer system, a set of the information sources that can be accessed based on the originator of the incoming message using a security system that determines which of the information sources can be used to identify the information and the contextual information such that different originators of incoming messages are allowed to receive different information from the set of information sources; and
identifying, by the computer system, the information responsive to the query and the contextual information related to the query from the set of the information sources using the query generated from the natural language processing of the incoming message.

5. The method of claim 4, wherein the incoming message and the outgoing message are selected from one of a voice message, a text message, a short message service message, a multimedia message service message, a chat message, and an instant messaging service message.

6. An automatic message reply system comprising:
a computer system that receives an incoming message; performs natural language processing on the incoming message to identify requested information and to generate a query for the requested information in response to an automatic response to the incoming message being enabled for an originator of the incoming message; identifies information responsive to the query and contextual information related to the query from information sources using the query generated from the natural language processing of the incoming message; generates an outgoing message using the information identified responsive to the query and the contextual information related to the query; and sends the outgoing message to the originator of the incoming message, wherein the natural language processing is performed by a natural language processor of the computer system to generate the query, and wherein the natural language processor of the computer system determines whether the automatic response to the incoming message is enabled for the originator based on a set of contacts designated to receive automatic responses, wherein the automatic response being enabled for the originator indicates that the natural language processing is to be performed on the incoming message to generate the query, wherein the information sources are selected from at least one of a global positioning system receiver, a calendar system, a database, a collaboration website, a social networking system, a file sharing service, a file server, a navigation system, a document management system, a weather service, an enterprise social software application, or a traffic information service, and further comprising: sending, by the natural language processor of the computer system, the query to a query system of the computer system that accesses the information sources to identify the information.

7. The automatic message reply system of claim 6, wherein the automatic response to the incoming message is enabled for the originator when the user is traveling in a vehicle, wherein the automatic response being enabled indicates that the natural language processing is to be performed on the incoming message to generate the query.

8. The automatic message reply system of claim 6, wherein the computer system receives a user input selecting settings for enabling the automatic response to the incoming message, wherein the automatic response being enabled indicates that the natural language processing is to be performed on the incoming message to generate the query.

9. The automatic message reply system of claim 6, wherein in identifying the information responsive to the query and the contextual information related to the information obtained from the information sources using the query generated from the natural language processing of the incoming message, the computer system determines a set of the information sources that can be accessed based on the originator of the incoming message using a security system that determines which of the information sources can be used to identify the information and the contextual information such that different originators of incoming messages are allowed to receive different information from the set of information sources and identifies the information responsive to the query and the contextual information related to the query from the set of the information sources using the query generated from the natural language processing of the incoming message.

10. The automatic message reply system of claim 9, wherein the incoming message and the outgoing message are selected from one of a voice message, a text message, a short message service message, a multimedia message service message, a chat message, or an instant messaging service message.

11. A computer program product for responding to an incoming message, the computer program product comprising:
a computer-readable storage media;
first program code, stored on the computer-readable storage media, for receiving the incoming message;
second program code, stored on the computer-readable storage media, for performing natural language processing on the incoming message to identify requested information and to generate a query for the requested information in response to an automatic response to the incoming message being enabled for an originator of the incoming message;

third program code, stored on the computer-readable storage media, for identifying information responsive to the query and contextual information related to the query from information sources using the query generated from the natural language processing of the incoming message;

fourth program code, stored on the computer-readable storage media, for generating an outgoing message using the information identified responsive to the query and the contextual information related to the query;

fifth program code, stored on the computer-readable storage media, for sending the outgoing message to the originator of the incoming message; and sixth program code, stored on the computer-readable storage media, for determining whether the automatic response to the incoming message is enabled for the originator based on a set of contacts designated to receive automatic responses, wherein the automatic response being enabled for the originator indicates that the natural language processing is to be performed on the incoming message to generate the query, wherein the information sources are selected from at least one of a global positioning system receiver, a calendar system, a database, a collaboration website, a social networking system, a file sharing service, a file server, a navigation system, a document management system, a weather service, an enterprise social software application, or a traffic information service, and further comprising:

sixth program code, stored on the computer-readable storage media, for sending the query to a query system of the computer system that accesses the information sources to identify the information.

12. The computer program product of claim 11, wherein the third program code comprises:

program code, stored on the computer-readable storage media, for determining a set of the information sources that can be accessed based on the originator of the incoming message using a security system that determines which of the information sources can be used to identify the information and the contextual information such that different originators of incoming messages are allowed to receive different information from the set of information sources; and program code, stored on the computer-readable storage media, for identifying the information responsive to the query and the contextual information related to the query from the set of the information sources using the query generated from the natural language processing of the incoming message.

13. The computer program product of claim 12, wherein the incoming message and the outgoing message are selected from one of a voice message, a text message, a short message service message, a multimedia message service message, a chat message, or an instant messaging service message.

* * * * *